US011256547B2

(12) United States Patent
Casotto

(10) Patent No.: US 11,256,547 B2
(45) Date of Patent: Feb. 22, 2022

(54) EFFICIENT ALLOCATION OF CLOUD COMPUTING RESOURCES TO JOB REQUESTS

(71) Applicant: Altair Engineering, Inc., Troy, MI (US)

(72) Inventor: Andrea Casotto, Fremont, CA (US)

(73) Assignee: Altair Engineering, Inc., Troy, MI (US)

( * ) Notice: Subject to any disclaimer, the term of this patent is extended or adjusted under 35 U.S.C. 154(b) by 0 days.

(21) Appl. No.: 15/931,456

(22) Filed: May 13, 2020

(65) Prior Publication Data

US 2020/0379813 A1 Dec. 3, 2020

Related U.S. Application Data

(60) Provisional application No. 62/855,476, filed on May 31, 2019.

(51) Int. Cl.
*G06F 9/50* (2006.01)
*G06F 9/48* (2006.01)

(52) U.S. Cl.
CPC .......... *G06F 9/5038* (2013.01); *G06F 9/4881* (2013.01); *G06F 9/5072* (2013.01); *G06F 9/5077* (2013.01); *G06F 2209/5011* (2013.01)

(58) Field of Classification Search
None
See application file for complete search history.

(56) References Cited

U.S. PATENT DOCUMENTS

| 8,209,395 | B2 | 6/2012 | Richoux |
| 8,261,277 | B2 | 9/2012 | Prabhakar et al. |
| 8,650,298 | B2 | 2/2014 | Daly et al. |
| 8,689,220 | B2 | 4/2014 | Prabhakar et al. |

(Continued)

FOREIGN PATENT DOCUMENTS

| JP | 4185919 | 11/2008 |
| JP | 2012504800 | 2/2012 |

OTHER PUBLICATIONS

Ahn et al., "A high performance computing scheduling and resource management primer", Lawrence Livermore National Laboratory, Mar. 2014, 8 pages.

(Continued)

*Primary Examiner* — Eric C Wai
(74) *Attorney, Agent, or Firm* — Fish & Richardson P.C.

(57) ABSTRACT

Methods, systems, and apparatus, including computer programs encoded on a computer storage medium, that facilitate efficient allocation of computing resources of a cloud computing environment to job requests. Methods include receiving multiple job requests and sorting these job requests into one or more categories that include job requests with a same or similar set of job attributes. Methods include allocating a first number of computing resources of the compute farm to one or more job requests in each category. Methods include determining an allocation rate at which the first number of computing resources are allocated to the one or more job requests in each category. Methods include determining a remaining number of job requests in each category and allocating a second number of computing resources of the compute farm to the remaining number of job requests in each category based on the allocation rate.

18 Claims, 4 Drawing Sheets

(56) References Cited

U.S. PATENT DOCUMENTS

| | | |
|---|---|---|
| 9,189,273 B2 | 11/2015 | Brochard et al. |
| 9,870,274 B2 | 1/2018 | Berghe |
| 9,983,907 B2 | 5/2018 | Li et al. |
| 2008/0235695 A1* | 9/2008 | Itou .................. G06F 9/4881 718/103 |
| 2010/0257531 A1 | 10/2010 | Barsness et al. |

OTHER PUBLICATIONS

Bare, "New—Predictive scaling for EC2, Powered by Machine Learning", AWS News Blog, Nov. 2018, 11 pages.

Hassan, "Workload Characterization, Controller Design and Performance Evaluation for Cloud Capacity Autoscaling", PhD Thesis Department of Computing Science, 2015, 233 pages.

Patel et al., "Priority based job scheduling techniques in cloud computing: A systemic review", International Journal of Scientific & Technology Research, Nov. 2013, 2(11):1-6.

Wu et al., "Job scheduling optimization of high performance computing in biological gene sequencing based on workload analysis", International Symposium on Parallel and Distributed Processing with Applications and International Conference on Ubiquitous Computing and Communications (ISPA/IUCC), 2017, 6 pages.

* cited by examiner

EFFICIENT ALLOCATION OF CLOUD COMPUTING RESOURCES TO JOB REQUESTS

CROSS-REFERENCE TO RELATED APPLICATIONS

This application claims priority to U.S. Provisional Application No. 62/855,476, filed May 31, 2019, the contents of which are incorporated herein by reference in their entirety.

TECHNICAL FIELD

This specification generally relates to cloud computing environments, and more specifically, to efficient allocation of computing resources of a cloud computing environment to job requests.

BACKGROUND

A cloud computing platform generally includes a collection of computing resources (e.g., servers) that are networked together (e.g., using Ethernet or other suitable interconnects) and that are used to process job requests (e.g., execute applications) that are requested by users over the Internet. Each of the computing resources in a cloud computing environment can have the same or varying configurations (e.g., size of random access memory, processor types and speeds, operating system type, etc.).

Generally, users from anywhere on the Internet can submit job requests to a cloud computing platform. The cloud computing platform in turn uses a job scheduler to identify the appropriate computing resources of the cloud computing platform to service the received job requests and then allocate these job requests to the identified cloud computing resources.

SUMMARY

A typical cloud computing environment supports a diverse group of users, having varying needs, and executing widely variable workloads. Because of such variable demands on a cloud computing environment, conventional job schedulers can be inefficient in allocating computing resources of a cloud computing platform to job requests. For example, certain conventional job scheduling techniques allocate computing resources based on the quantity of job requests in the workload. Thus, as the number of job requests in the workload increases, such conventional job schedulers allocate additional computing resources of the cloud computing platform. However, allocating cloud computing resources in this manner can be inefficient because the time and operational cost (e.g., power consumption cost, equipment cooling costs, equipment leasing costs) of acquiring a particular cloud computing resource and instantiating/executing this resource (e.g., powering up, booting the resource, loading the appropriate operating system and software, etc.) is often much more than the time and operational cost required to reuse already-allocated and executing cloud computing resources.

Particular embodiments of the subject matter described in this specification efficiently utilize cloud computing resources in responding to job requests. Specifically, the techniques described in this specification can reuse already-executing cloud computing resources to service job requests in instances when instantiating additional cloud computing resources would be inefficient. As described above, such inefficiencies arise, for example, when the time required to acquire and execute a new cloud computing resource (i.e., a latency to start time) exceeds the time required to allocate one or more job requests to already-executing cloud computing resources.

The techniques described in this specification can avoid such inefficiencies, e.g., by (1) determining an estimated time required to allocate (or dispatch) job requests to already-executing cloud computing resources using the rate (or speed) at which job requests in a workload are allocated to computing resources and (2) comparing this estimated time to the latency to start time (or another appropriate time threshold). If the estimate time does not exceed the latency to start time (or another appropriate time threshold), the techniques described in this specification allocate the job requests to the already-instantiated cloud computing resources. On the other hand, if the estimated time exceeds the latency to start time (or another appropriate time threshold), the techniques described in this specification allocate additional cloud computing resources to service these job requests. Thus, by enabling reuse of already-executing cloud computing resources to service additional job requests, the techniques described in this specification can achieve significant operational and cost efficiencies in terms of reduced usage of cloud computing resources, which in turn reduces the power consumption and costs (e.g., equipment maintenance costs, equipment leasing costs, power consumption costs) of the cloud computing platform.

Moreover, the techniques described in this specification can achieve the above-described efficiencies without unduly delaying execution of the job requests. For example, by using a time threshold (e.g., a latency to start time) in determining whether to instantiate additional cloud computing resources, the techniques described in this specification do not delay execution of job requests any longer than the time that would be required to acquire and execute additional computing resources. As a result, from a user's perspective, the job requests are executed by the cloud computing platform in a timely fashion.

In general, one aspect of the subject matter described in this specification can be embodied in methods allocating computing resources in a cloud computing environment, which can include the operations of: receiving a plurality of job requests; sorting the plurality of job requests into one or more categories that include job requests with a same set of job attributes; for each category, allocating job requests in the category to the computing resources of a compute farm, wherein the allocating comprises: allocating a first number of computing resources of the compute farm to one or more job requests in the category; determining an allocation rate at which the first number of computing resources are allocated to the one or more job requests in the category; determining a remaining number of job requests in the category; and allocating a second number of computing resources of the compute farm to the remaining number of job requests in the category based on the allocation rate. Other embodiments of this innovative aspect include corresponding systems, devices, apparatus, and computer programs configured to perform the actions of the methods. The computer programs (e.g., instructions) can be encoded on computer storage devices. These and other embodiments can each optionally include one or more of the following features.

In some implementations, methods can include scaling the remaining number of job requests using the allocation rate to obtain an estimated time within which the remaining number of job requests will be allocated to the first number of computing resources; and wherein allocating a second number of computing resources of the compute farm to the remaining number of job requests in the category based on the allocation rate, comprises allocating the second number of computing resources of the compute farm to the remaining number of job requests in the category based on the estimated time.

In some implementations, allocating the second number of computing resources of the compute farm to the remaining number of job requests in the category based on the estimated time, can include: determining that the estimated time does not exceed a first threshold; in response to determining that the estimated time does not exceed the first threshold, allocating the second number of computing resources of the compute farm to the remaining number of job requests in the category, wherein the second number of computing resources is the same as the first number of computing resources.

In some implementations, allocating the second number of computing resources of the compute farm to the remaining number of job requests in the category based on the estimated time, can include: determining that the estimated time exceeds a first threshold; in response to determining that the estimated time exceeds the first threshold, allocating the second number of computing resources of the compute farm to the remaining number of job requests in the category, wherein the second number of computing resources includes the first number of computing resources and a number of available computing resources of the compute farm.

In some implementations, the first threshold can be a time required to acquire and execute a computing resource of the compute farm.

In some implementations, the set of job attributes can include one or more of: memory requirements for the job request; software license requirements for the job request; processor requirements for the job request; or storage requirements for the job request.

In some implementations, allocating job requests in the category to the computing resources of a compute farm is performed on a repeating time cycle.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification relates to efficient allocation of computing resources of a cloud computing environment to job requests.

Users can submit multiple job requests (e.g., to execute certain applications, such as simulators), over the Internet, for execution by a cloud computing platform. A job scheduler of the cloud computing platform allocates the collection of received job requests (which will be referred to in this specification as workload) to computing resources managed by the cloud computing platform.

As further described below, upon receiving the workload, the job scheduler identifies jobs with the same or similar job attributes (e.g., CPU requirement, memory requirement, software application). The job scheduler then sorts job requests with the same or similar job attributes into one or more categories or buckets.

For each category of job requests, the job scheduler allocates a number of job requests to a first number of computing resources of the cloud computing platform. The job scheduler uses the number of allocated job requests in a category and the time within which these job requests have been allocated to determine a job allocation rate, i.e., the rate at which the job requests in a category are allocated to the first number of computing resources. The job scheduler then uses this job allocation rate to determine an estimated time in which additional job requests will be allocated to the first number of computing resources. In particular, the job scheduler determines the estimated time by dividing the number of additional job requests by the job allocation rate.

The job scheduler compares the estimated time to a first threshold (which may be a latency to start time, as described above). If the job scheduler determines that the estimated time does not exceed the first threshold, the job scheduler allocates the job requests to the first number of computing resources. On the other hand, if the job scheduler determines that the estimated time exceeds the first threshold, the job scheduler allocates the job requests to the first number of computing resources as well as to additional available computing resources. The job scheduler can repeat the above operations, e.g., on a repeating time cycle, until the job requests in a category are allocated to computing resources of the cloud computing platform.

These features and additional features are described in more detail below with reference to FIGS. 1-4.

Figure 1:
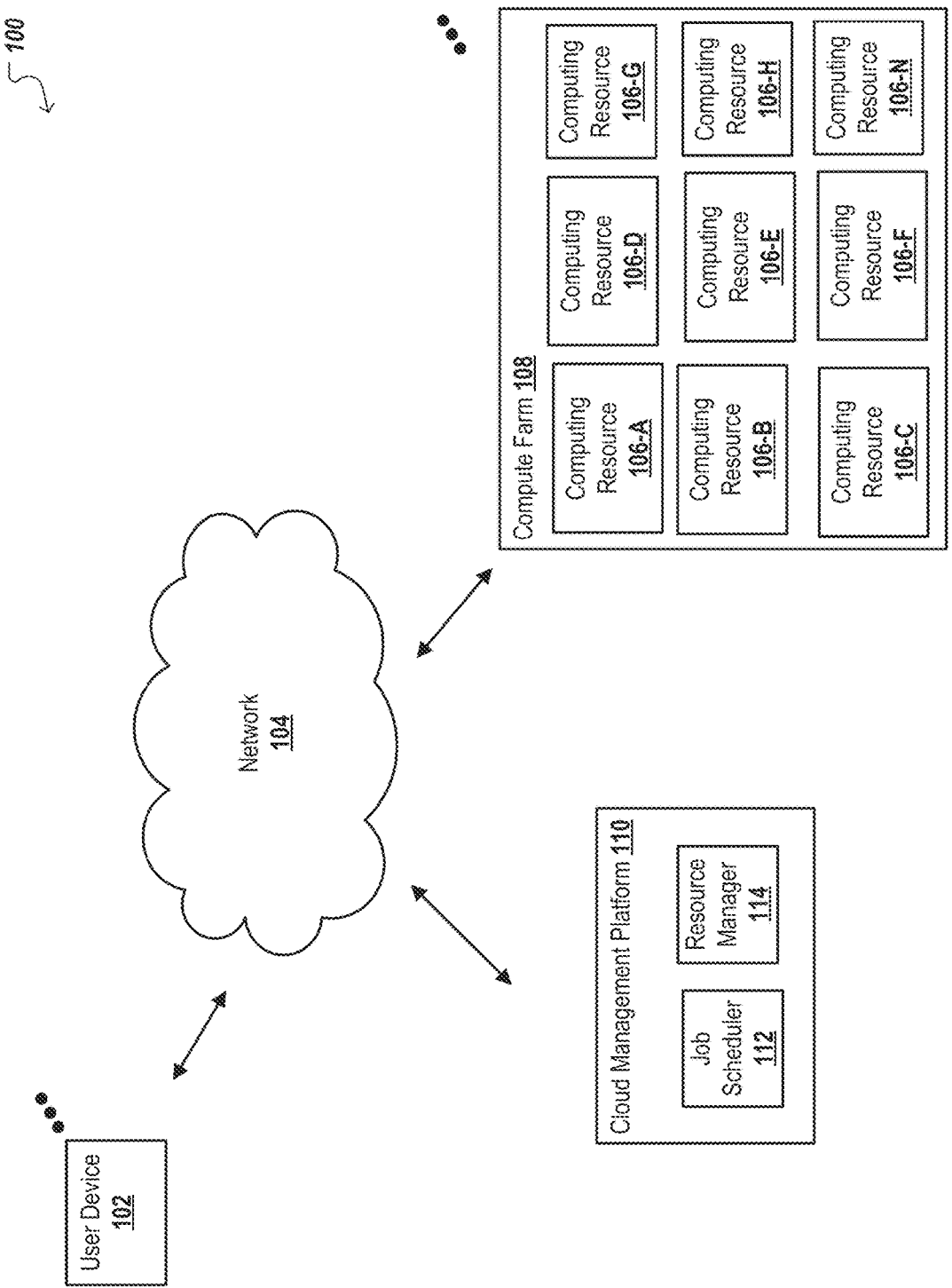
FIG. 1 is a block diagram of an example cloud computing environment.

FIG. 1 is a block diagram of an example cloud computing environment 100.

The example cloud computing environment 100 includes a network 104, such as a local area network (LAN), a wide area network (WAN), the Internet, or a combination thereof. The network 104 connects user devices 102, cloud management platform 110, and compute farm 108.

A user device 102 is an electronic device that a user uses to, e.g., submit requests to a cloud management platform 110. Example user devices 102 include personal computers, mobile communication devices, digital assistant devices, and other devices that can send and receive data over the network 104. A user device 102 typically includes a user application, such as a web browser, to facilitate the sending and receiving of data over the network 104, but native applications executed by the user device 102 can also facilitate the sending and receiving of content over the network 104.

Users of user devices 102 submit job requests to a cloud management platform 106 to be executed using computing resources provided by the cloud management platform 106. In general, a job request is a request by a user to execute a computer program or application (e.g., a simulator, a design software) or to obtain a computing resource with a particular configuration (e.g., a particular processor running a particular type of operating system with a defined amount of storage). In general, each job request uses one or more computing resources. Computing resources generally include hardware resources, such as for example, processors, memory, storage disk space, etc., as well as software resources, such as for example, operating systems, applications, software, licenses, etc.

Compute farm 108 (also referred to in this specification as a server farm) is a collection of networked computing resources where each computing resource can execute one or more job requests. Each computing resource of the compute farm 108 can include an interface to receive inputs, provide outputs, and is connected (e.g., using Ethernet or other suitable interconnects) with other computer resources. Each computing resource includes at least one or more processors and one or more memory devices (e.g., RAM). The networked computing resources of the compute farm 108 can be organized in any number of ways, e.g., using a grid or a cluster organization. In some implementations, each computing resource includes a particular hardware configuration (e.g., processor type, memory size, etc.) and is configured using appropriate software (e.g., operation system, design software, or other applications) based on a received job request. In other implementations, each computing resource includes a pre-defined hardware and software configuration.

The cloud management platform 110 is a computing platform that manages and provides computing resources in response to job requests received from users over the Internet. The cloud management platform 110 can include any hardware, software, firmware, or combination thereof, and may be written or described in any appropriate computer language including C, C++, Java, assembler, any suitable version of 4GL, and others or any combination thereof. In some implementations, the cloud management platform 110 includes a job scheduler 112 and a resource manager 114.

Job scheduler 112 includes hardware, software, and/or embedded logic component or one or more such components for configuring and allocating computing resources (106-A to 106-N) of the compute farm 108 to job requests. Resource manager 114 includes hardware, software, and/or embedded logic component or one or more such components for monitoring the use and availability of the computing resources (106-A to 106-N) of the compute farm 108.

When the cloud management platform 110 receives users' job requests, the cloud management platform 110 invokes the job scheduler 112 to allocate one or more computing resources (106-A to 106-N) to the job requests. In some implementations, when cloud management platform 110 invokes the job scheduler 112, the resource manager 114 can identify and provide the job scheduler 112 with a list of computing resources in the compute farm 108 that are being used by other job requests as well as computing resources available to be allocated to job requests.

The job scheduler 112 then analyzes the collection of job requests and allocates one or more of these job requests to a set of computing resources of the compute farm 108. As further described below with reference to FIGS. 2 and 3, for the remaining job requests that have not been allocated to computing resources, the job scheduler 112 determines whether to scale up the number of computing resources by requesting additional computing resources or to reuse already executing computing resources, based on a job allocation rate (i.e., a rate or speed at which jobs are allocated to computing resources of the compute farm 108).

Figure 2:
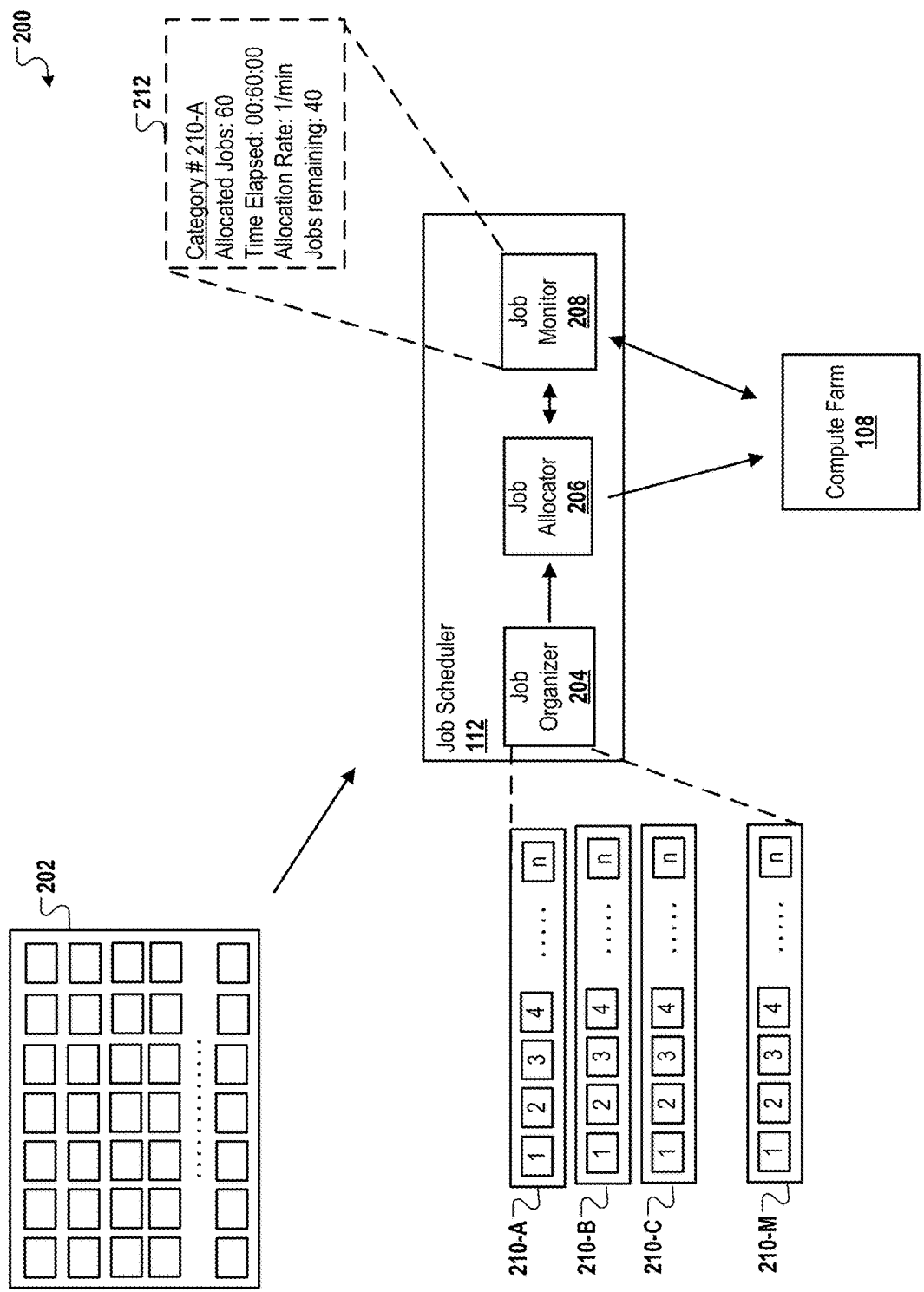
FIG. 2 is a block diagram that illustrate the structure and operations of the job scheduler, which is shown in the example computing environment of FIG. 1, in allocating job requests to computing resources.

FIG. 2 is a block diagram that illustrate the structure and operations of the job scheduler 112 in allocating job requests to computing resources of the compute farm 108.

As shown in FIG. 2, the job scheduler 112 includes three engines: a job organizer 204, a job allocator 206, and a job monitor 208. Generally, engines includes data processing apparatus (e.g., including hardware as well as software executing on hardware) that performs a set of tasks. The job scheduler 112 uses these three engines to analyze and allocate computing resources to the different job requests of the workload 202. The operations of these engines in analyzing and allocating computing resources to the different job requests in the workload 202 are described below with reference to FIG. 3.

Figure 3:
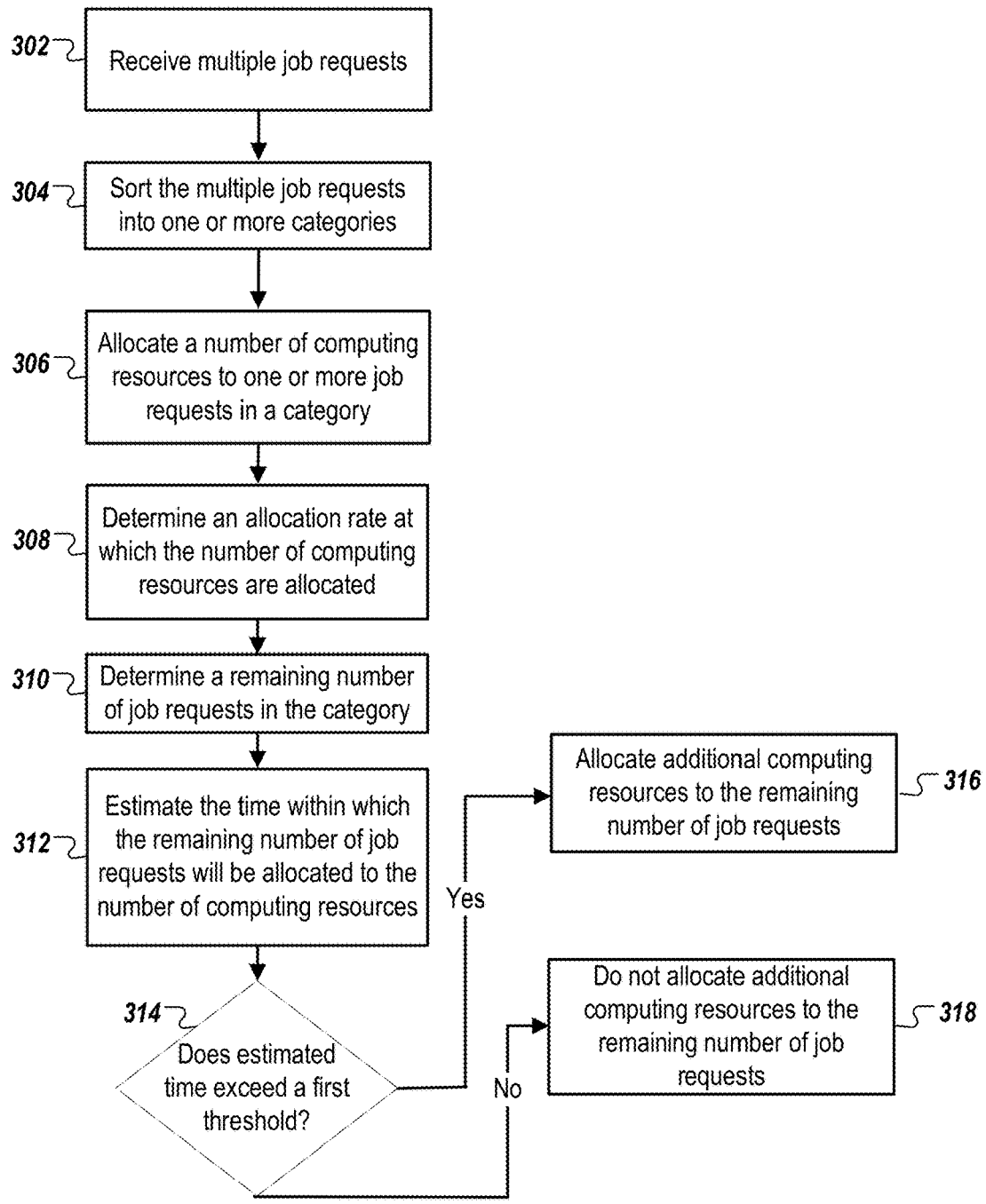
FIG. 3 is a flow diagram of an example process that analyzes and allocates job requests to computing resources in the example cloud computing environment of FIGS. 1 and 2.

FIG. 3 is a flow diagram of an example process 300 that analyzes and allocates job requests to computing resources in a cloud computing environment (such as the example cloud environment shown in FIG. 1). For illustration, the operations of the process 300 are described with reference to the job scheduler 112 and the compute farm 108 of FIGS. 1 and 2. Operations of the process 300 can be performed by any appropriate device or system, e.g., any appropriate data processing apparatus. Operations of the process 300 can also be implemented as instructions stored on a non-transitory computer readable medium. Execution of the instructions cause one or more data processing apparatus to perform operations of the process 300.

The job scheduler 112 receives multiple job requests (at 302). As shown in FIG. 2, the job scheduler 112 receives workload 202, which includes multiple different job requests. As an example, the workload 202 includes 1000 job requests.

The job organizer engine 112 sorts the multiple job requests into one or more categories based on job attributes (at 304). Generally, a job attribute is a characteristic of a job request that is used in determining the appropriate computing resources to allocate to the job request. Example job attributes include memory (e.g., RAM) requirements, software application requirements (e.g., simulators, graphic design, testing software), license requirements (e.g., licenses required for software applications), processor requirements (e.g., number of processor cores, processor types, processing power), operating system requirements, storage requirements, job priority requirements (which can specify the priority or order in which particular jobs are to be executed), and user requirements (e.g., groups, projects, or other organizational structures).

The job organizer engine 112 determines the attributes for a job request by parsing a job request. In some implementations, the job request can include a separate tag for each attribute. For example, a job request may include a "RAM" and a "Processor Cores" tag. The job organizer engine 112 stores a list of these tags (e.g., in a data storage device) that it uses to identify the one or more tags in a job request and their corresponding values. Using these identified attributes, the job organizer engine 112 generates a list of job requests and their corresponding attributes. The job organizer engine 112 sorts the job requests into one or more categories of job requests with the same set of attributes. In some implementations, the job organizer engine 112 includes, in a single category, all job requests with a certain number (e.g., three) of matching attributes. For example, the job organizer engine 112 can include job requests with the same processor, software application, and memory requirements in a single category.

In some implementations, the job organizer engine 112 sorts job requests with similar attributes into a category. For example, although two job requests may have different processor requirements, the job organizer engine 112 may nevertheless sort these job requests into the same category because the two different processors specified in these requests may have the same processing power. In such implementations, the job organizer engine 112 includes additional logic that correlates different values of a job attribute based on a common parameter associated with each attribute. In the above example, the job organizer engine 112 can store the processor types and the corresponding processing powers for each type of processor. Using this information, the job organizer engine 112 can identify different processor types with the same processing power (i.e., the common parameter associated with each "processor type" job attribute), and includes job requests specifying these different processor types in the same category.

Using the sorting approach described above, the job organizer engine 112 sorts the requests in the workload into a number of categories, with each category including a number of job requests. For example, as depicted in FIG. 2, the job organizer engine 112 sorts the requests in the workload 202 into M categories (210-A to 210-M) of n job requests. It will be appreciated that the number of job requests in the workload, the number of categories, and the number of job in each category may vary from the above-provided numbers. It will be further appreciated that the number of job requests in each category may be different.

The job allocator engine 206 allocates a number of computing resources to one or more job requests in a category (at 306). In some implementations, the job organizer 204 sends a message to the job allocator 206. This message identifies the different categories (e.g., 210-A to 210-M) and their respective job requests. In some implementations, this message can also include the set of job attributes corresponding to the job requests in each category. The job allocator engine 206 can use a conventional job allocation algorithm to allocate one or more job requests in a category to a first number of computing resources of the compute farm 108. In some implementations, the job allocator engine 206 can allocate a set number of computing resources of the compute farm 108 to job requests in each category 210-A to 210-M. In some implementations, the job allocator engine 206 can initially only allocate a subset of the total number job requests in a category of job requests. For example, the job allocator engine 206 may only initially allocate 60 job requests of the 100 total job requests in category 210-A to a first number of computing resources of the compute farm 108.

The job scheduler 112 performs operations 308 to 318 to allocate the remaining job requests in each category to computing resources of the compute farm 108. These operations can be performed on a repeating time cycle (e.g., 5 seconds, 1 minute, or another appropriate time scale). Alternatively, these operations can be performed each time the job allocator engine 206 allocates a set of job requests of a category to the computing resources.

The job monitor engine 208 determines an allocation rate at which the number of computing resources are allocated to the job requests in a category (at 308). In some implementations, the job allocator engine 206 sends a message to the job monitor engine 208 specifying the number of job requests in a category that it allocates to the computing resources. In some implementations, the job allocator engine 206 sends this message each time it allocates computing resources to job requests in a particular category. Alternatively, the job monitor engine 208 can query the job allocator engine 206 on a repeating time cycle (e.g., 5 seconds, 1 minutes, or another appropriate time scale) to request the number of job requests that have been allocated to computing resources. In response, the job allocator engine 206 sends the above-described message to the job monitor engine 208 that provides a count of the number of job requests allocated to the computing resources. Alternatively, the job allocator engine 206 sends a message to the job monitor engine 208 on a repeating cycle (e.g., 5 seconds, 1 minute, or another appropriate time scale) in which it specifies the number of job requests in a particular category allocated to computing resources since the last time it sent this message.

The job monitor engine 208 uses these messages from the job allocator engine 206 to determine a count of the number of job requests in the category that have been allocated. For example, the job monitor engine 208 can add the number of computing resources identified in each message and store this sum in a data structure, e.g., data structure 212. The data structure 212 stores a number of the allocated job requests in each category. As shown in FIG. 2, the data structure 212 stores the number of allocated job requests of 60 for the category 210-A.

The job monitor engine 208 also includes a timer that the job monitor engine 208 initiates when the job allocator engine 206 begins allocating job requests of a particular category to the computing resources of the compute farm. In some implementations, each time the job allocator engine 206 sends a message to the job monitor engine 208 identifying additional job requests of a category that have been allocated to computing resources (as described above), the job monitor engine 208 identifies the time on the timer for when that message was received. As shown in FIG. 2, the job monitor engine 208 stores this time in a Time Elapsed field of the data structure 212. For each subsequent message that the job allocator engine 206 sends to the job monitor engine 208, the job monitor engine 208 updates the Time Elapsed field with the current time on the running timer. In this way, the job monitor engine 208 can store a data structure, such as data structure 212, which includes the number of job requests allocated for a particular category and the total time within which the job requests in this category are allocated to computing resources of the compute farm 108.

Using the count of the number of currently allocated job requests and the elapsed time, the job monitor engine 208 determines an allocation rate for the computing resources that have already been allocated to job requests in a particular category. In some implementations, the job monitor engine 208 divides the number of allocated job requests by the elapsed time to determine the allocation rate. For example, as shown in FIG. 2, the job monitor engine 208 maintains a data structure 212, in which it stores the count of the allocated job requests (60) and the elapsed time (00:60:00 or 60 minutes) for category 210-A. The job monitor engine 208 thus determines that the current allocation rate for job requests in this category is one job request per minute (i.e., 60 job requests divided by 60 minutes). The job monitor engine 208 stores the allocation rate in the data structure 212.

It will be appreciated that the job monitor engine 208 updates the values in the data structure 212 each time it receives a message from the job allocator engine 206 (whether it is on a repeating cycle or when computing resources are allocated to job requests). As a result, the data structure 212 stores dynamic or real-time information about the currently allocated jobs, the time in which these jobs were allocated, and the current job allocation rate.

The job monitor engine 208 determines a remaining number of job requests in the category (at 310). The job organizer 204 sends a message to the job monitor engine 208 that identifies the different categories and their corresponding job requests. In some implementations, the job organizer 204 can send this message to the job monitor engine 208 at the same time that this information is also sent to the job allocator engine 206 (as described above). The job monitor engine 208 uses this information to determine a total number of job requests in the category. In some implementations, the job organizer engine 204's message may include a "TOTAL" tag for each category, which identifies the total number of job requests in each category. In such implementations, the job monitor engine 208 searches for and identifies the "TOTAL" tag from the message, and identifies the total number of job requests for each category. In some implementations, the job organizer engine 204's may not include the total number of job requests. In such implementations, the job monitor engine 208 uses a counter to count the job requests for each category identified in the message received from the job organizer engine 204.

The job monitor engine 208 then determines the remaining number of job requests in the category that still need to be allocated to computing resources of the compute farm 108 by computing a difference between the total number of job requests in a category and the allocated number of job requests. For example, assuming that category 210-A includes 100 job requests, the job monitor engine 208 determines that 40 job requests still need to be allocated by computing a difference between the total number of job requests (100) and the currently allocated job requests (60). The job monitor engine 208 can store the number of remaining job requests for a category, e.g., in a data structure 212 (as shown in FIG. 2).

It will be appreciated that the job monitor engine 208 updates the values in the data structure 212 each time it receives a message from the job allocator engine 206 (whether it is on a repeating cycle or when computing resources are allocated to job requests). As a result, the data structure 212 stores dynamic or real-time information about the remaining job requests for a category.

The job monitor engine 208 estimates the time within which the remaining number of job requests will be allocated to the computing resources (at 312). In some implementations, the job monitor engine 208 estimates the time within which the remaining number of job requests will be allocated to the first number of computing resources time by dividing the remaining number of job requests in the category by the job allocation rate for that category. For example, for the category 210-A, the job monitor engine 208 divides the remaining job requests of 40 by the 1 job request per minute allocation rate to determine an estimate that it will take 40 minutes to allocate the remaining number of job requests to the first number of computing resources. In some implementations, the job monitor engine 208 can estimate the time required to allocate a set of job requests less than the remaining number of job requests in a particular category. For example, the job allocator engine 206 may only allocate, at any given time, ten computing resources to job requests from a particular category. In such scenarios, the job monitor engine 208 estimates the time required to allocate ten job requests to the first number of computing resources.

It will be appreciated that the job monitor engine 208 determines an estimated time within which the remaining number of job requests will be allocated to the first number of computing resources each time it receives a message from the job allocator engine 206 (whether it is on a repeating cycle or when computing resources are allocated to job requests).

The job monitor engine 208 determines whether the estimated time exceed a first threshold (at 314). In some implementations, the job monitor engine 208 compares the estimated time (as determined in operation 312) with the first threshold. The first threshold can be a specified threshold, for example, of ten minutes. The first threshold can also be a latency to start time. In general (and as described above), a latency to start time refers to the amount of time required to acquire a computing resource and to execute the computing resource (e.g., boot the computing resource, load the operating system, and configure the system with the appropriate software applications and tools). It will be appreciated that a cloud computing platform generally cannot control the latency to start time of computing resources in the compute farm 108.

If the job monitor engine 208 determines that the estimated time exceeds the first threshold, the job allocator engine 208 allocates additional available computing resources to the remaining number of job requests (at 316). In some implementations, the job monitor engine 208 can query the resource manager 114 to determine the number of available computing resources in the compute farm 108. In this query, the job monitor engine 208 can specify the attributes of the job requests in the particular category of job requests, which, e.g., is provided in the message sent by the job organizer engine 204 to the job monitor engine 208 (as described above). For example, the job monitor engine 208 can specify that it needs computing resources that include a particular number of cores and a particular software application.

The resource manager 114 uses the specified job attributes to identify available computing resources. In some implementations, the resource manager 114 stores attributes of each computing resource in the compute farm 108 as well as the number of software licenses and/or limits on available resources. The resource manager 114 compares the attributes of job requests in the category to the attributes of the computing resources as well as the licenses/limits on these resources. For example, if the query includes a request for computing resources with a particular number of cores, the resource manager 114 identifies available computing resources of the compute farm 108 with that number of cores. However, if the query also specifies a particular software application, the resource manager 114 determines whether it has any available licenses for that software (e.g., licenses that are not already being used by other allocated computing resources). If the compute farm 108 does not have any unallocated licenses for that software application, it responds to the query from the job monitor engine 208 with a "no available resources" message (or other similar denial message). On the other hand, if the resource manager determines that appropriate computing resources are available to service the job requests in a particular category, it identifies the appropriate computing resources requests in a response to the job monitor engine 208.

In some implementations, prior to sending the message to the job monitor engine 208 identifying additional computing resources, the resource manager 114 can also determine whether allocation of the additional computing resources would exceed any operational cost limits (e.g., total cost limits of leasing hardware computing resources, total power consumption cost, etc.). If allocating additional computing resources would not exceed any operational cost limits, the resource manager 114 can send the message identifying the additional computing resources to the job monitor engine 208. On the other hand, if allocating additional computing resources would exceed any operational cost limits, the resource manager 114 can send a "no available resources" to the job monitor engine 208.

In some implementations, prior to sending the message to the job monitor engine 208 identifying additional computing resources, the resource manager 114 can also determine whether pending requests for additional computing does not exceed a certain threshold. If other job requests that were awaiting allocation to additional available computing resources exceeds the threshold, the resource manager 114 can send a "no available resources" to the job monitor engine 208. On the other hand, if the other job requests that were awaiting allocation to additional available computing resources does not exceed the threshold, the resource manager 114 can send the message identifying the additional computing resources to the job monitor engine 208.

When computing resources are available for allocation to job requests, the resource manager 114 sends the job monitor engine 208 the message including the identification of the available computing resources to the job allocator engine 206. The job monitor engine 208 can send this message to the job allocator engine 206, which in turn allocates these available computing resources and/or the first number of computing resources to the remaining number of job requests (or to a subset of job requests from the remaining number of job requests). In some implementations, the allocator engine 206 allocates all the identified computing resources to the job requests. For example, if the number of available computing resources is 100 and if 100 job requests need to be allocated to computing resources, the job allocator engine 206 may allocate one available computing resource to each job request. In some implementations, the job allocator engine 206 can allocate a subset of the available computing resources to the job requests. In such implementations, the job allocator engine 206 can allocate a number of computing resources in a manner that is proportional (e.g., 1/10, 1/2) to the number of remaining job requests. For example, if the number of available computing resources is 100 and if 100 job requests need to be allocated to computing resources, the job allocator engine 206 may only allocate 10 computing resources, which is 1/10th of the 100 job requests. It will be appreciated that the job allocator engine 206 can consider other criteria (e.g., operational limits, costs, etc.) in determining the number of available computing resources to allocate to job requests.

On the other hand, if the job monitor engine 208 determines that the estimated time does not exceeds the first threshold, the job monitor engine 208 determines that no additional computing resources are needed (at 318). In some implementations, the job monitor engine 208 sends a message to the job allocator engine 206 stating that no additional computing resources are available. The job allocator engine 206 in turn allocates the remaining job requests (or a subset of those job requests) to the already-executing (first number) computing resources. In some implementations, the resource manager 114 sends a message to the job allocator engine 206 identifying the computing resources within the already-executing computing resources that are becoming available (i.e., those computing resources that have completed the job requests they were previously processing). The job allocator engine 206 then allocates the remaining job requests (or a subset of these job requests) to the already-executing computing resources as they become available.

As described above, the job scheduler 112 determines an estimated time within which computing resources are allocated to (all or a subset of) the remaining number of jobs, and then compares this estimated time to a first threshold. In some implementations, instead of evaluating whether the estimated time exceeds a first threshold based on time, the job scheduler can compare the job allocation rate to a rate based threshold in determining whether to allocate additional computing resources. In such implementations, the job monitor engine 208 compares the job allocation rate (determined at operation 308) with a first rate-based threshold. For example, if the threshold is 2 job requests per minute, the job monitor engine 208 compares the calculated allocation rate (e.g., of 1 job per minute) to the threshold rate of 2 jobs per minute. Because the allocation rate is slower than (i.e., is less than) the threshold rate, the job monitor engine 208 can message the job allocator engine 206 to allocate additional computing resources (as described above). However, if the allocation rate is faster than (i.e., greater than) the threshold rate, the job monitor engine 208 can message the job allocator engine 206 to allocate the first number of computing resources to the job requests (as described above). It will be appreciated that these operations can be performed each time the job monitor engine 208 receives a message from the job allocator engine 206 (whether it is on a repeating cycle or when computing resources are allocated to job requests).

In some scenarios, some of the already executing computing resources may become available, but the job allocator engine 206 may not allocate any additional job requests to these resources. In such scenarios, the resource manager 114 can determine whether the amount of time that these executing computing resources remain available (and thus, idle) meets or exceeds a time threshold (e.g., one minute, five minutes, ten minutes, etc.). If the amount of time that these executing computing resources remain idle meets or exceeds the time threshold, the resource manager 114 releases these computing resources (e.g., powers them down). On the other hand, if the amount of time that these executing computing resources remain idle does not meet the time threshold, the resource manager 114 performs no action and thus, these resources continue to remain idle.

Figure 4:
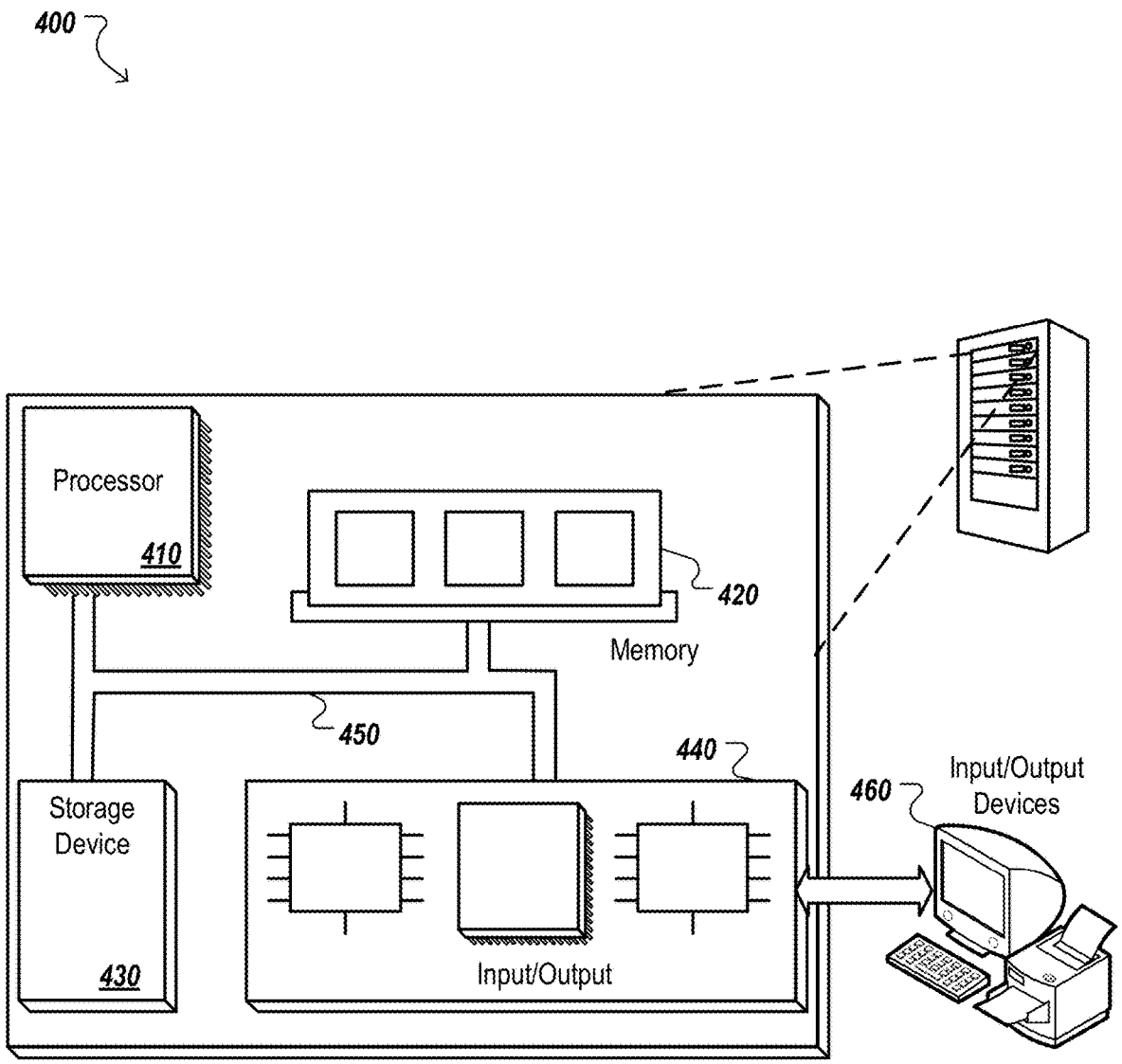
FIG. 4 is a block diagram of an example computer system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method for allocating computing resources in a cloud computing environment, comprising:
   receiving a plurality of job requests;
   sorting the plurality of job requests into one or more categories that include job requests with a same set of job attributes;
   for each category, allocating job requests in the category to the computing resources of a compute farm, wherein the allocating comprises:
      allocating a first number of computing resources of the compute farm to one or more job requests in the category;
      determining an allocation rate at which the first number of computing resources are allocated to the one or more job requests in the category;
      determining a remaining number of job requests in the category;
      scaling the remaining number of job requests using the allocation rate to obtain an estimated time within which the remaining number of job requests will be allocated to the first number of computing resources; and
      allocating a second number of computing resources of the compute farm to the remaining number of job requests in the category based on the estimated time.

2. The computer implemented method of claim 1, wherein allocating the second number of computing resources of the compute farm to the remaining number of job requests in the category based on the estimated time, comprises:
   determining that the estimated time does not exceed a first threshold;
   in response to determining that the estimated time does not exceed the first threshold, allocating the second number of computing resources of the compute farm to the remaining number of job requests in the category, wherein the second number of computing resources is the same as the first number of computing resources.

3. The computer implemented method of claim 2, wherein the first threshold is a time required to acquire and execute a computing resource of the compute farm.

4. The computer implemented method of claim 1, wherein allocating the second number of computing resources of the compute farm to the remaining number of job requests in the category based on the estimated time, includes:
   determining that the estimated time exceeds a first threshold;
   in response to determining that the estimated time exceeds the first threshold, allocating the second number of computing resources of the compute farm to the remaining number of job requests in the category, wherein the second number of computing resources includes the first number of computing resources and a number of available computing resources of the compute farm.

5. The computer implemented method of claim 1, wherein the set of job attributes includes one or more of:
   memory requirements for the job request;
   software license requirements for the job request;
   processor requirements for the job request; or
   storage requirements for the job request.

6. The computer implemented method of claim 1, wherein allocating job requests in the category to the computing resources of a compute farm is performed on a repeating time cycle.

7. A system for allocating computing resources in a cloud computing environment, comprising:
one or more memory devices storing instructions; and
one or more data processing apparatus that are configured to interact with the one or more memory devices, and upon execution of the instructions, perform operations including:
receiving a plurality of job requests;
sorting the plurality of job requests into one or more categories that include job requests with a same set of job attributes;
for each category, allocating job requests in the category to the computing resources of a compute farm, wherein the allocating comprises:
allocating a first number of computing resources of the compute farm to one or more job requests in the category;
determining an allocation rate at which the first number of computing resources are allocated to the one or more job requests in the category;
determining a remaining number of job requests in the category;
scaling the remaining number of job requests using the allocation rate to obtain an estimated time within which the remaining number of job requests will be allocated to the first number of computing resources; and
allocating a second number of computing resources of the compute farm to the remaining number of job requests in the category based on the estimated time.

8. The system of claim 7, wherein allocating the second number of computing resources of the compute farm to the remaining number of job requests in the category based on the estimated time, comprises:
determining that the estimated time does not exceed a first threshold;
in response to determining that the estimated time does not exceed the first threshold, allocating the second number of computing resources of the compute farm to the remaining number of job requests in the category, wherein the second number of computing resources is the same as the first number of computing resources.

9. The system of claim 8, wherein the first threshold is a time required to acquire and execute a computing resource of the compute farm.

10. The system of claim 7, wherein allocating the second number of computing resources of the compute farm to the remaining number of job requests in the category based on the estimated time, includes:
determining that the estimated time exceeds a first threshold;
in response to determining that the estimated time exceeds the first threshold, allocating the second number of computing resources of the compute farm to the remaining number of job requests in the category, wherein the second number of computing resources includes the first number of computing resources and a number of available computing resources of the compute farm.

11. The system of claim 7, wherein the set of job attributes includes one or more of:
memory requirements for the job request;
software license requirements for the job request;
processor requirements for the job request; or
storage requirements for the job request.

12. The system of claim 7, wherein allocating job requests in the category to the computing resources of a compute farm is performed on a repeating time cycle.

13. A non-transitory computer readable medium storing instructions that, when executed by one or more processors, cause the one or more processors to perform operations for allocating computing resources in a cloud computing environment, comprising:
receiving a plurality of job requests;
sorting the plurality of job requests into one or more categories that include job requests with a same set of job attributes;
for each category, allocating job requests in the category to the computing resources of a compute farm, wherein the allocating comprises:
allocating a first number of computing resources of the compute farm to one or more job requests in the category;
determining an allocation rate at which the first number of computing resources are allocated to the one or more job requests in the category;
determining a remaining number of job requests in the category;
scaling the remaining number of job requests using the allocation rate to obtain an estimated time within which the remaining number of job requests will be allocated to the first number of computing resources; and
allocating a second number of computing resources of the compute farm to the remaining number of job requests in the category based on the estimated time.

14. The non-transitory computer readable medium of claim 13, wherein allocating the second number of computing resources of the compute farm to the remaining number of job requests in the category based on the estimated time, comprises:
determining that the estimated time does not exceed a first threshold;
in response to determining that the estimated time does not exceed the first threshold, allocating the second number of computing resources of the compute farm to the remaining number of job requests in the category, wherein the second number of computing resources is the same as the first number of computing resources.

15. The non-transitory computer readable medium of claim 13, wherein allocating the second number of computing resources of the compute farm to the remaining number of job requests in the category based on the estimated time, includes:
determining that the estimated time exceeds a first threshold;
in response to determining that the estimated time exceeds the first threshold, allocating the second number of computing resources of the compute farm to the remaining number of job requests in the category, wherein the second number of computing resources includes the first number of computing resources and a number of available computing resources of the compute farm.

16. The non-transitory computer readable medium of claim 15, wherein the first threshold is a time required to acquire and execute a computing resource of the compute farm.

17. The non-transitory computer readable medium of claim 13, wherein the set of job attributes includes one or more of:
   memory requirements for the job request;
   software license requirements for the job request;
   processor requirements for the job request; or
   storage requirements for the job request.

18. The non-transitory computer readable medium of claim 13, wherein allocating job requests in the category to the computing resources of a compute farm is performed on a repeating time cycle.

* * * * *